C. W. Flint,
Ice Shaver
Nº 85,080.  Patented Dec. 22, 1868.
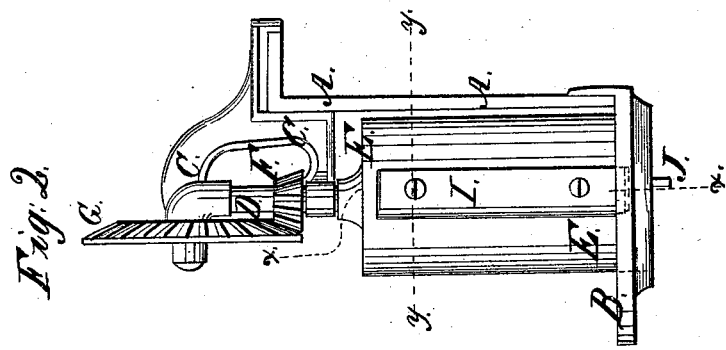
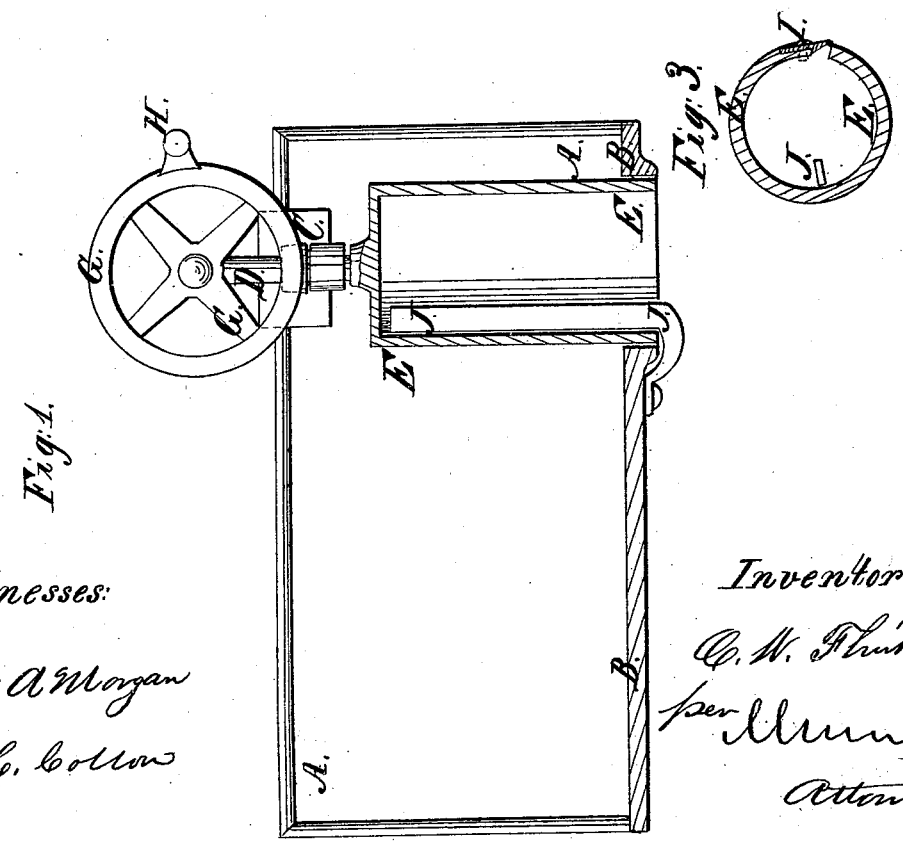
Witnesses:
Wm A Morgan
G. C. Colton
Inventor:
C. W. Flint
per Munn &
Attorneys.

C. W. FLINT, OF WASHINGTON, DISTRICT OF COLUMBIA.

Letters Patent No. 85,080, dated December 22, 1868; antedated December 19, 1868.

IMPROVED ICE-CUTTER.

The Schedule referred to in these Letters Patent and making part of the same.

*To all whom it may concern:*

Be it known that I, C. W. FLINT, of Washington, in the District of Columbia, have invented a new and improved Ice-Cutter; and I do hereby declare that the following is a full, clear, and exact description of the same, which will enable others skilled in the art to make and use the same, reference being had to the accompanying drawings, forming a part of this specification.

Figure 1 is a front view of my improved machine, partly in section through the line x x, fig. 2.

Figure 2 is an end view of the same.

Figure 3 is a detail sectional view of the cutting-cylinder, taken through the line y y, fig. 2.

Similar letters of reference indicate corresponding parts.

My invention has for its object to furnish a simple, convenient, and effective machine for cutting or shaving ice in restaurants, saloons, for soda-fountains, and for similar uses; and It consists in the construction and combination of the various parts, as hereinafter more fully described.

A is a light metallic plate, screwed fast to the counter, or other suitable and convenient support.

B is a shelf or outwardly-projecting flange, formed upon or attached to the lower edge of the plate A, and which should be of sufficient width to hold the block of ice.

C is a two-armed bracket, formed upon or attached to the upper edge of the plate A, near its forward end, in which bracket is hung and revolves a short vertical shaft, D, having a hollow cylinder, E, attached to its lower end, so as to be carried around with said shaft in its revolution.

To the shaft D, between the arms of the bracket C, is attached a small bevel-gear wheel, F, into the teeth of which mesh the bevel-teeth formed upon the inner side of the crank-wheel G, which revolves upon an axle formed upon the outer end of the upper arm of the bracket C, and to which motion is given by means of the crank-pin or handle H, formed upon or attached to said wheel G.

The hollow cylinder E is slotted vertically from its lower end in one or more places, and to the edge of the slot or slots thus formed is adjustably attached a knife, I, by set-screws, or other convenient means, so that the said knife may be conveniently adjusted to cut or shave the ice coarser or finer, as may be desired.

J is a stationary scraper, attached to the shelf or flange B, and which projects upward along the inner side of the cylinder E, so as to scrape off or detach the fine ice from the interior of the said cylinder, allowing it to fall into the goblet or tumbler held beneath the open lower end of said cylinder.

If desired, a small shelf may be attached to the counter or other support, in a convenient position to hold the goblet or tumbler while cutting the ice.

Having thus described my invention,

What I claim as new, and desire to secure by Letters Patent, is—

An improved ice-cutter, formed by the combination of the plate A, shelf or flange B, two-armed brackets C, crank-gear wheel G, small gear-wheel F, vertical shaft D, vertical hollow cylinder E, adjustable knife or knives I, and scraper J, with each other, substantially as herein shown and described, and for the purpose set forth.

The above specification of my invention signed by me, this 2d day of June, 1868.

C. W. FLINT.

Witnesses:
  ALEX. F. ROBERTS,
  JAMES T. GRAHAM.